(12) United States Patent
Carrick et al.

(10) Patent No.: US 11,692,071 B2
(45) Date of Patent: Jul. 4, 2023

(54) AGGLOMERATING NANOPARTICLES

(71) Applicant: Peratech Holdco Limited, Richmond (GB)

(72) Inventors: Ian Carrick, Darlington (GB); Paul Jonathan Laughlin, Houghton-le-Spring (GB)

(73) Assignee: Peratech Holdco Limited, Richmond (GB)

( * ) Notice: Subject to any disclaimer, the term of this patent is extended or adjusted under 35 U.S.C. 154(b) by 580 days.

(21) Appl. No.: 16/644,298

(22) PCT Filed: Sep. 6, 2018

(86) PCT No.: PCT/GB2018/000119
§ 371 (c)(1),
(2) Date: Mar. 4, 2020

(87) PCT Pub. No.: WO2019/048809
PCT Pub. Date: Mar. 14, 2019

(65) Prior Publication Data
US 2021/0061671 A1    Mar. 4, 2021

(30) Foreign Application Priority Data
Sep. 6, 2017  (GB) .................................. 1714279

(51) Int. Cl.
| | |
|---|---|
| *B01J 8/00* | (2006.01) |
| *C08J 3/12* | (2006.01) |
| *C01G 30/00* | (2006.01) |
| *B82B 3/00* | (2006.01) |
| *B82Y 30/00* | (2011.01) |

(52) U.S. Cl.
CPC ................. *C08J 3/12* (2013.01); *B82B 3/008* (2013.01); *C01G 30/00* (2013.01); *B82Y 30/00* (2013.01); *C01P 2002/52* (2013.01); *C01P 2004/30* (2013.01); *C01P 2004/64* (2013.01)

(58) Field of Classification Search
CPC ...... B01J 8/006; B01D 29/00; B01D 29/0018; B01D 29/0027
See application file for complete search history.

(56) References Cited

U.S. PATENT DOCUMENTS

| | | | |
|---|---|---|---|
| 5,323,971 A * | 6/1994 | Nishibori | ................ B29B 17/02 241/3 |
| 9,546,859 B2 | 1/2017 | Lussey et al. | |
| 2015/0137026 A1* | 5/2015 | Engler | ..................... C09C 1/00 252/75 |

OTHER PUBLICATIONS

T. Ogi et al, Recent Progress in Nanoparticle Dispersion Using Bead Mill, Kona Powder and Particle, vol. 34, Jan. 30, 2016, pp. 3-23, XP002785998, DOI: 10.14356/kona.2017004, Sections 1.1, 1.2, 2, 2.1, 2.2, 5, 6; Table 1.

(Continued)

*Primary Examiner* — Hoa (Holly) Le
(74) *Attorney, Agent, or Firm* — Richard M. Goldberg

(57) ABSTRACT

A method of agglomerating nanoparticles to form larger agglomerates is shown. The nanoparticles are mixed with a resin to form a first mixture (803) of agglomerates, having sizes over a range that includes agglomerates considered to be too large, suspended in the resin. A bead milling cylinder (802) produces a second mixture (808) with fewer large agglomerates. A filter (1001) removes the remaining large agglomerates. The resulting mill base is cut with a solvent before deployment.

11 Claims, 16 Drawing Sheets

(56) References Cited

OTHER PUBLICATIONS

M. Englert et al, Verification of a Dispersion Model to Describe the Dispersion of Nanoparticle Agglomerates in Epoxy Resin with a Stirred Bead Mill, Journal of Dispersion Science and Technology, vol. 33, 2012, pp. 1240-1246, XP002785999, Sections 1, 2.1, 2.2, 2.2.2 4; Fig. 2.

Y. Liu et al., De-agglomeration andDispersion of Ano—TiO2 in an Agitator Bead Mill, Journal of Dispersion Science and Technology, vol. 27, 2006, pp. 983-990, XP002786000.

* cited by examiner

AGGLOMERATING NANOPARTICLES

CROSS REFERENCE TO RELATED APPLICATIONS

This application claims priority from United Kingdom Patent Application number 17 14 279.5, filed on 6 Sep. 2017, the whole contents of which are incorporated herein by reference.

BACKGROUND OF THE INVENTION

The present invention relates to a method of agglomerating nanoparticles to form larger agglomerates. Procedures for agglomerating nanoparticles to form larger agglomerates are disclosed in U.S. Pat. No. 9,546,859, assigned to the present applicant. The particles may be held in a resin such that said resin, in liquid form due to dilution by a solvent, may be applied to a transparent base sheet. Thereafter, following evaporation of the solvent, a cover sheet may be arranged over the layer of dry resin to fabricate a subassembly. This in turn may be deployed as a transparent touchscreen, in which the base sheet and the cover sheet are separated by a dispersion of agglomerates of less than ten micrometres, so as to be virtually invisible to the human eye. However, when pressure is applied, compression of these agglomerates between the base sheet and the cover sheet results in the electrical resistance of these agglomerates changing, which in turn may be measured to determine a position of contact in an XY plane and a degree of applied pressure in the Z dimension.

Known techniques allow agglomerates to be produced that fall within an optimal range of possibly five micrometres to ten micrometres. In this way, an application of resin of an optimised consistency ensures that, after evaporation, a proportion of each of the agglomerates is held by the resin, while the remainder extends above the resin; thereby allowing contact to be made. Within this optimal range, specific sizes may follow a normal (Gaussian) distribution.

Although most of the agglomerates fall within the desired range, a problem has been identified in that a small proportion of agglomerates may be present that are of a larger size; effectively lying outside the normal distribution of sizes and identified herein as "outliers". These outliers can create problems after fabrication, in that pressure sensitivity over a device may become unacceptably varied and may cause false triggering.

BRIEF SUMMARY OF THE INVENTION

According to an aspect of the present invention, there is provided a method of agglomerating nanoparticles to form larger agglomerates, comprising the steps of: mixing said nanoparticles with a resin to form a first mixture of agglomerates suspended in said resin, said first mixture comprising agglomerates having a largest dimension which is greater than a predetermined specified dimension; bead milling said first mixture to produce a second mixture with a reduced number of agglomerates having a largest dimension greater than said predetermined specified dimension; and filtering said second mixture to produce a third mixture of agglomerates suspended in said resin, wherein substantially none of said agglomerates have a largest dimension greater than said predetermined specified dimension; wherein said first mixture comprises a percentage by weight of nanoparticles to resin of three percent.

In an embodiment, the nanoparticles have a size less than one hundred nanometres and may be spherical or acicular. The nanoparticles may be particles of antimony doped tin oxide.

In an embodiment, the predetermined specified dimension provides an indication of agglomerates that are considered to be too large. In an embodiment, agglomerates having a size greater than ten micrometres are considered to be too large and the predetermined specified dimension is identified as being ten micrometres. Preferably, the bead milling operation deploys a mixing power that is controlled to minimise reducing the size of agglomerates to a size below five micrometres. Preferably, the filtering step deploys a filter with openings having a size of ten micrometres.

Embodiments of the invention will be described, by way of example only, with reference to the accompanying drawings. The detailed embodiments show the best mode known to the inventor and provide support for the invention as claimed. However, they are only exemplary and should not be used to interpret or limit the scope of the claims. Their purpose is to provide a teaching to those skilled in the art. Components and processes distinguished by ordinal phrases such as "first" and "second" do not necessarily define an order or ranking of any sort.

DETAILED DESCRIPTION OF THE INVENTION

FIG. 1

Figure 1:
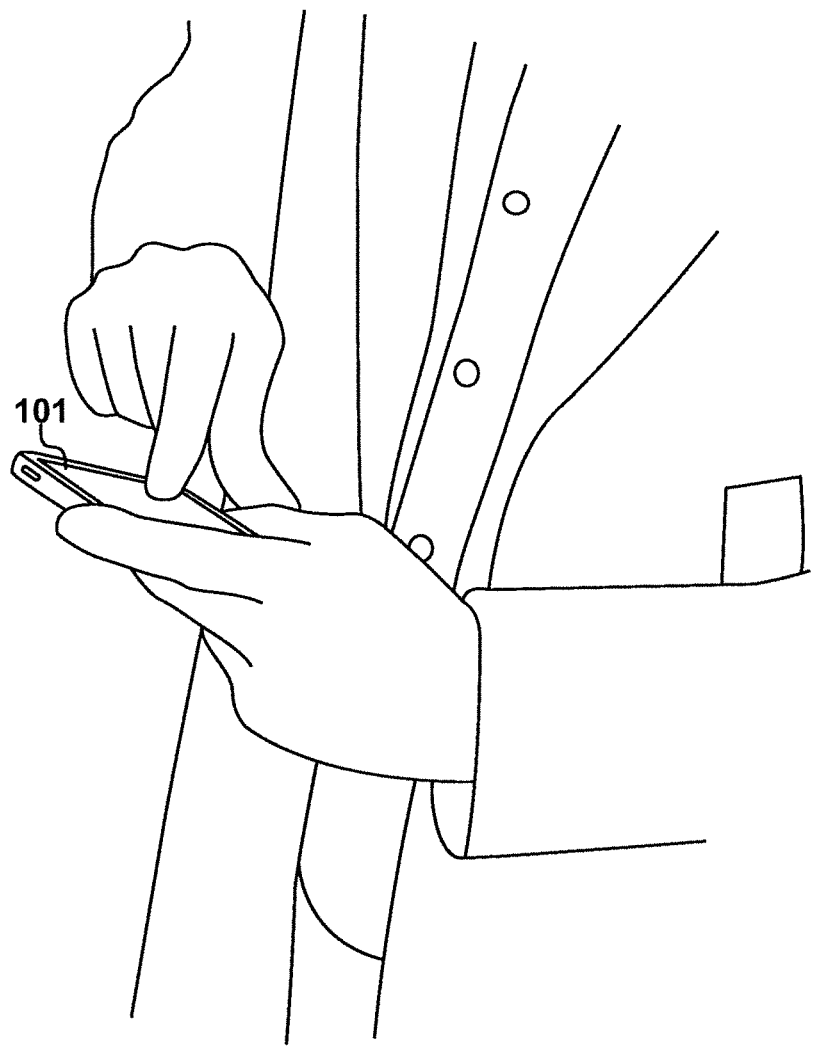
FIG. 1 shows use of a mobile cellular telephone with a touchscreen.

A method of agglomerating nanoparticles to form larger agglomerates is described in U.S. Pat. No. 9,546,859, assigned to the present applicant. The nanoparticles are mixed with a resin to form a mixture of agglomerates. The mixture of agglomerates in resin may then be applied onto a base sheet, whereafter the solvent is allowed to evaporate then covered by a cover sheet. A layer of dry resin results but some of the agglomerates extend above the surface of the resin such that when pressure is applied, the extending agglomerates experience a compressive force causing a change to their resistive properties. Consequently, this change in electrical resistance may be measured in order to provide a determination of the extent of force applied.

The resulting subassembly may be incorporated within a mobile device, as part of a substantially transparent screen. The dry resin is substantially transparent and the agglomerates, although opaque, are still so small that they are not visible to the human eye. Thus, for example, the substantially transparent screen may be incorporated in a mobile cellular telephone 101. The screen of the mobile cellular telephone is responsive to detecting the position of a manual interaction. However, with the provision of a subassembly embodying an aspect of the present invention, the screen is also responsive to a degree of pressure applied by a user, as illustrated on FIG. 1.

FIG. 2

In the method disclosed in U.S. Pat. No. 9,546,859, the nanoparticles are mixed with resin at a concentration appropriate for direct deployment onto a base sheet. However, at this concentration, the mixture cannot be stored for significant periods of time, given that the agglomerates will tend to settle to the bottom of the mixture, with the resin residing at the top. This may in turn encourage the agglomerates to create larger agglomerates that can cause significant problems when deployed. In particular, a device may experience false triggering and produce erroneous results, given that the larger agglomerates may be experiencing pressure without a physical interaction occurring. It has also been appreciated that when immediate deployment does occur, the mixture may still include agglomerates that are considered to be too large.

A possible approach to removing agglomerates that are considered to be too large would be to perform an aggressive procedure of bead milling. With sufficient energy, the bead milling process can reduce the size of the particles to ensure that none of the particles exceed a size that is considered to be too large. However, experiments conducted using this approach also reduced the size of the particles that were considered to be the correct size which, in a standard mixture, make up a majority of the particles present. Consequently, when deployed, too many of the particles fell below a minimum size and were therefore totally embedded within the dry resin and as such could not contribute to the required variable resistive properties.

A further problem with bead milling is that when the mixture is milled at deployment concentrations, it is effectively too thin for the process to operate within its established parameters.

An alternative approach would be to filter the mixture through a fine filter mesh under an appropriate degree of pressure. However, in experiments, this approach removed too many large particles too quickly, resulting in the filter mesh becoming clogged; such that the degree of pressure required for continued filtering became too large. Thus, the procedure is not only time consuming but also potentially dangerous.

The inventors have found that the use of a bead milling operation can be deployed if done at a lower energy level, to reduce the size of some of the agglomerates considered to be too large while not destroying too many of the agglomerates that are considered to be of the correct size. Furthermore, by bead milling a mixture of much higher resin to solvent concentration, it is possible to make use of the bead milling equipment to produce a mill base without the use of additional solvent. Furthermore, with this much higher loading of resin, the particles will not tend to sink to the bottom of a container and will remain mixed for substantially longer than a few days. However, a problem still exists with the mixture, in that some particles will still be present that are considered to be too large; although at a lower concentration.

The inventors have found that it is possible to significantly improve a mill base if after bead milling the more heavily loaded mixture, a process of filtering is then performed. Thus, experiments have shown that by removing a significant proportion of the particles considered to be too large in the bead milling operation, it is then possible to remove the remaining particles considered to be too large by a filtering operation, without the filter becoming clogged too soon.

A method of agglomerating nanoparticles to form larger agglomerates is therefore proposed in which the nanoparticles are mixed with a resin (without additional solvent) to form a first mixture of agglomerates having sizes over a range that does include agglomerates considered to be too large suspended in the resin. The method then continues by bead milling the first mixture to produce a second mixture with a reduced number of agglomerates considered to be too large. This is then followed by filtering the second mixture to produce a third mixture of agglomerates suspended in the resin, where substantially none of the agglomerates have a size considered to be too large.

Figure 2:
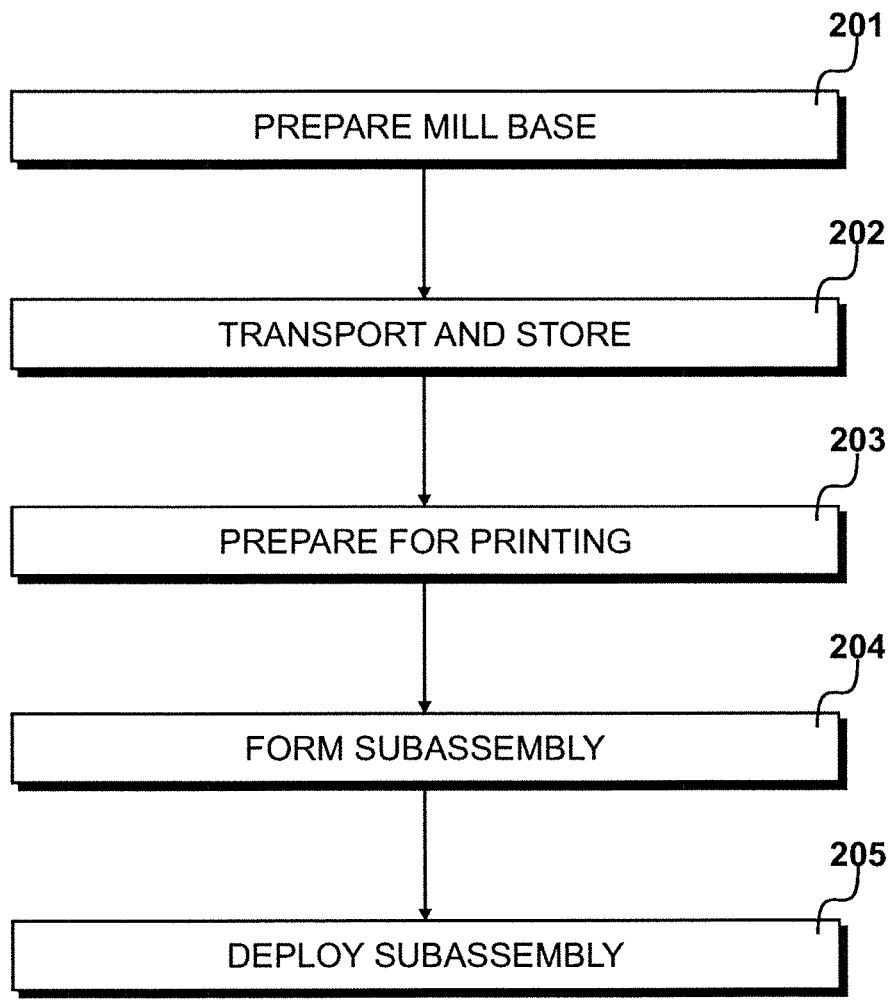
FIG. 2 illustrates stages of preparation to allow material to be deployed in the device identified in FIG. 1.
Figure 3:
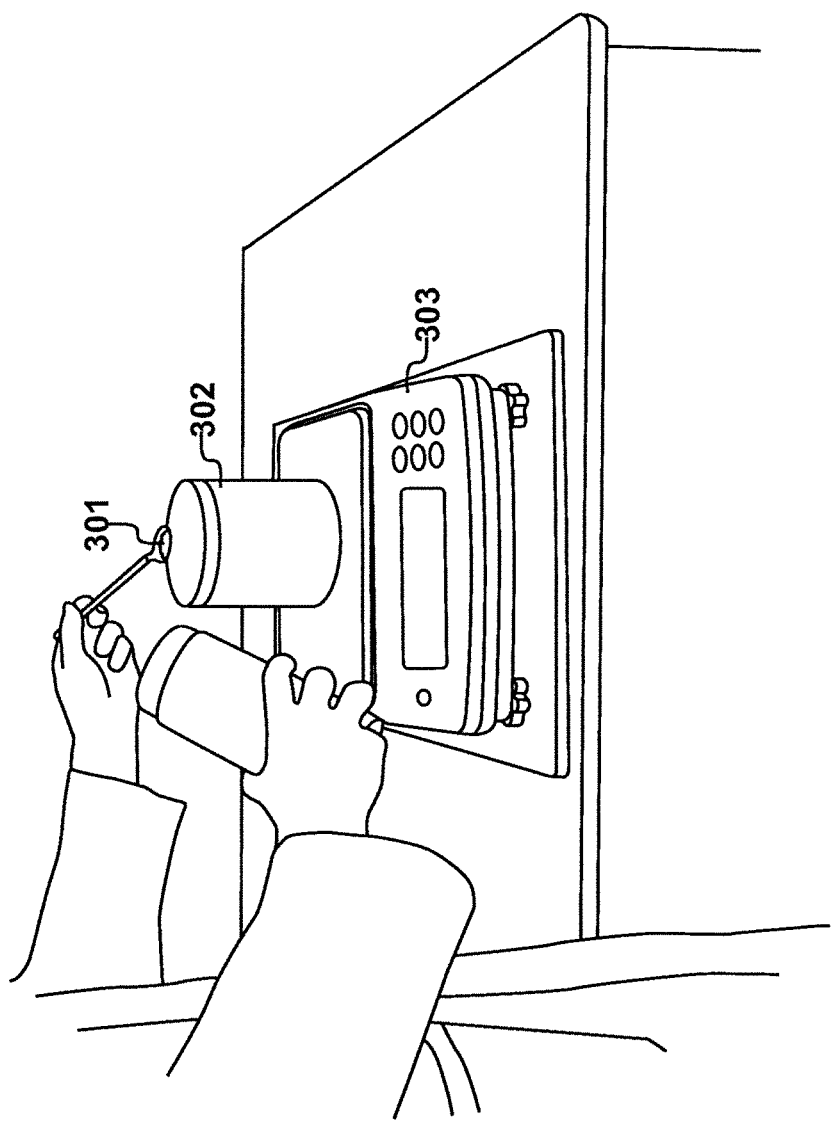
FIG. 3 illustrates the pouring and weighing of nanoparticles.
Figure 4:
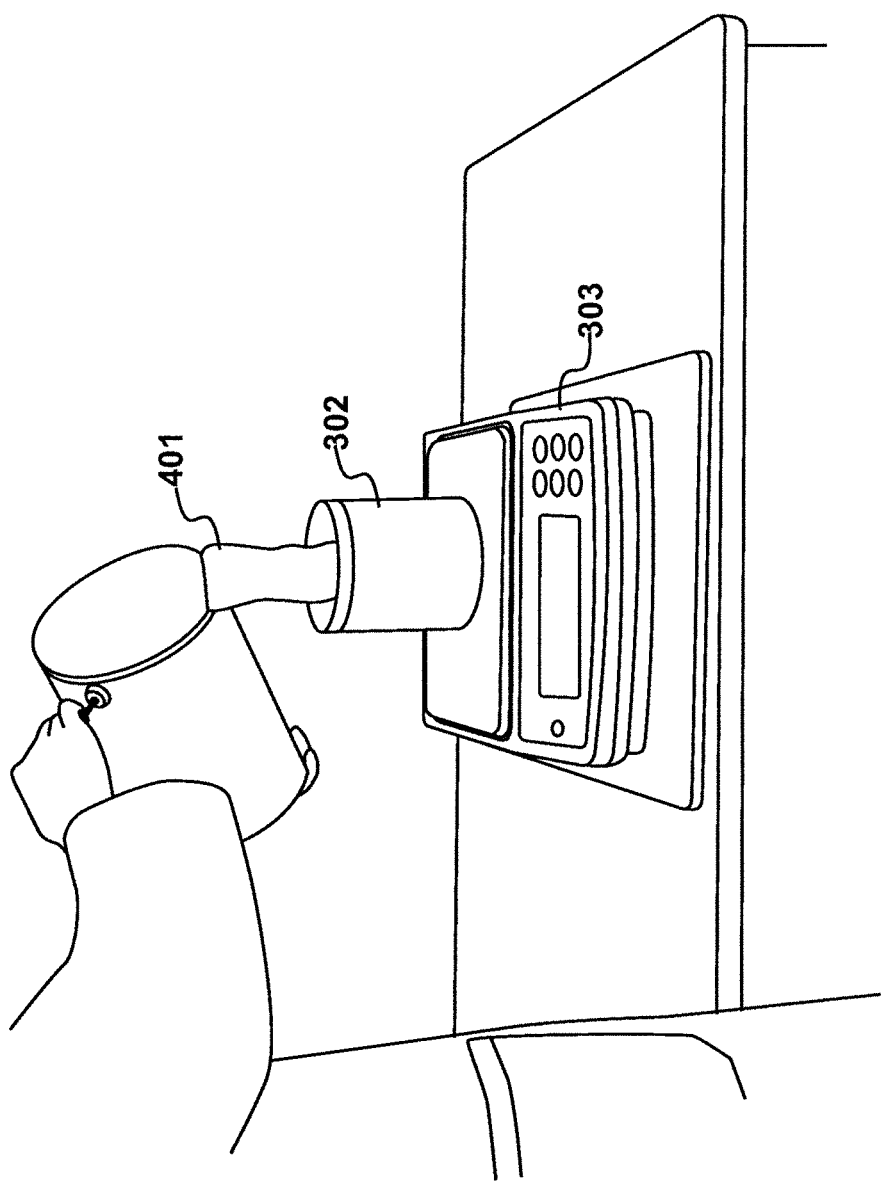
FIG. 4 illustrates the addition of a resin.
Figure 5:
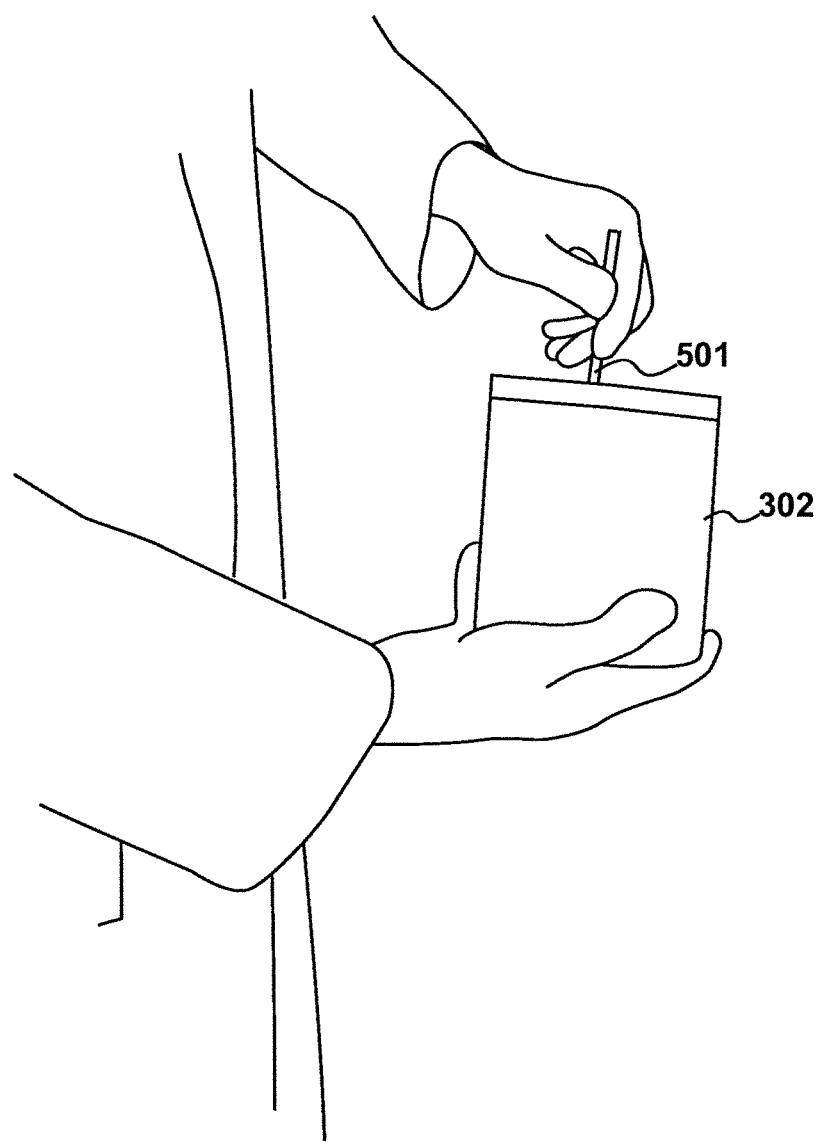
FIG. 5 illustrates the stirring of a resulting mixture.

As illustrated in FIG. 2, this allows the material to be deployed in an apparatus of the type described with reference to FIG. 1.

At step 201 a mill base is prepared, as will be described in detail with reference to FIGS. 3 to 10. The mill base comprises a mix of suitable nanoparticles and resin. After preparation, at step 202 the mill base may be transported and stored for longer periods of time (generally months compared to days) without experiencing significant separation and possible further agglomeration.

At step 203 the mill base is prepared for printing whereafter, at step 204, a subassembly is formed. Finally, at step 205 the subassembly is deployed in an apparatus, possibly of the type described with reference to FIG. 1.

FIG. 3

In an embodiment, nanoparticles 301 are placed in a first container 302 and carefully weighed by an accurate weighing device 303. In an embodiment, the nanoparticles have a size of less than one hundred nanometres (100 nm). The nanoparticles may be substantially spherical. Alternatively, the nanoparticles may be acicular. In an embodiment, the nanoparticles are particles of antimony doped tin oxide. Particles of this type are identified by the commercial designation FS10P.

When referred to by size, it is appreciated that the dimension of less than one hundred nanometres (100 nm) for example is taken to mean the largest dimension of the particles. Thus, in the case of spherical particles, the largest dimension is considered to be equivalent to the largest diameter, such that a spherical nanoparticle having a size of less than one hundred nanometres (100 nm) would have a largest diameter of less than one hundred nanometres (100 nm). Similarly, for an acicular nanoparticle, one having a size of less than one hundred nanometres (100 nm) would have a largest dimension (typically the length) of less than one hundred nanometres (100 nm).

FIG. 4

After the application of the nanoparticles, resin 401 is added to the first container 302 and again carefully weighed by the accurate weighing device 303. In an embodiment, the resin is a solvent-based undiluted lacquer. A typical lacquer of this type is an APR varnish identified by the commercial designation VA401.

FIG. 5

Having added sufficient lacquer, a manual stirring tool 501 is used to manually stir the nanoparticles into the lacquer held within the first container 302.

FIG. 6

Figure 6:
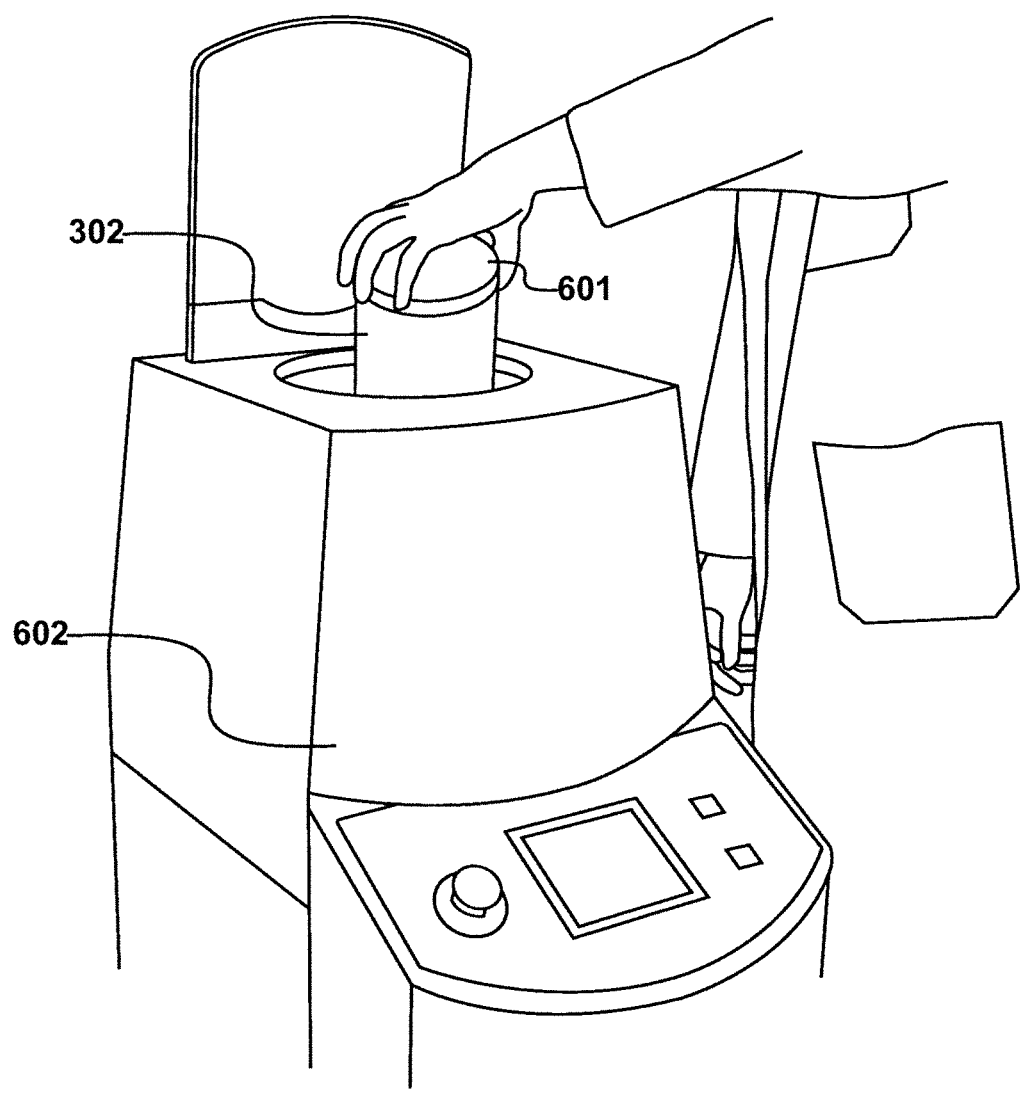
FIG. 6 illustrates the insertion of the mixture into a speed mixer.

After manually stirring the mixture, possibly for a period of two minutes, the first container 302 is sealed with a first sealing cap 601. The sealed container is then inserted in a speed mixer 602, as illustrated in FIG. 6.

Previously, when mixing the more diluted formulation, speed mixing was conducted for a period of two minutes at three thousand five hundred revolutions per minute (3500 rpm). However, with this more heavily loaded mixture, the mixing is performed preferably at a lower speed of typically one thousand six hundred revolutions per minute (1600 rpm).

FIG. 7

Figure 7:
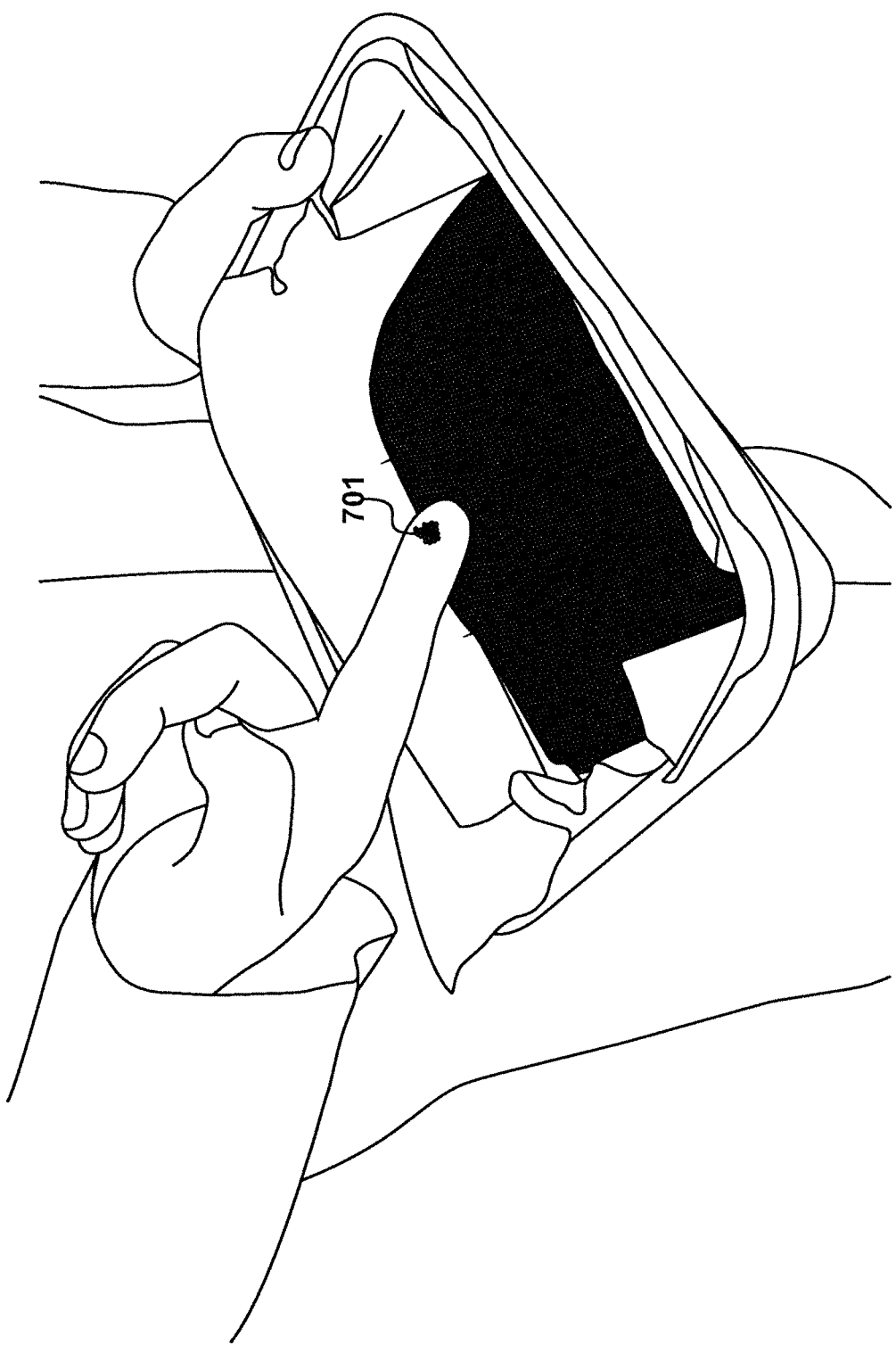
FIG. 7 illustrates bead milling particles.

Commercially available bead milling particles 701 are illustrated in FIG. 7. The bead milling machine, described with reference to FIG. 8, rotates the mixture with the bead milling particles 701 in order to reduce the size of the agglomerates. The bead milling apparatus presents a gap that allows the agglomerates to escape and be collected. However, this gap is too small to allow the bead milling particles 701 to escape.

FIG. 8

Figure 8:
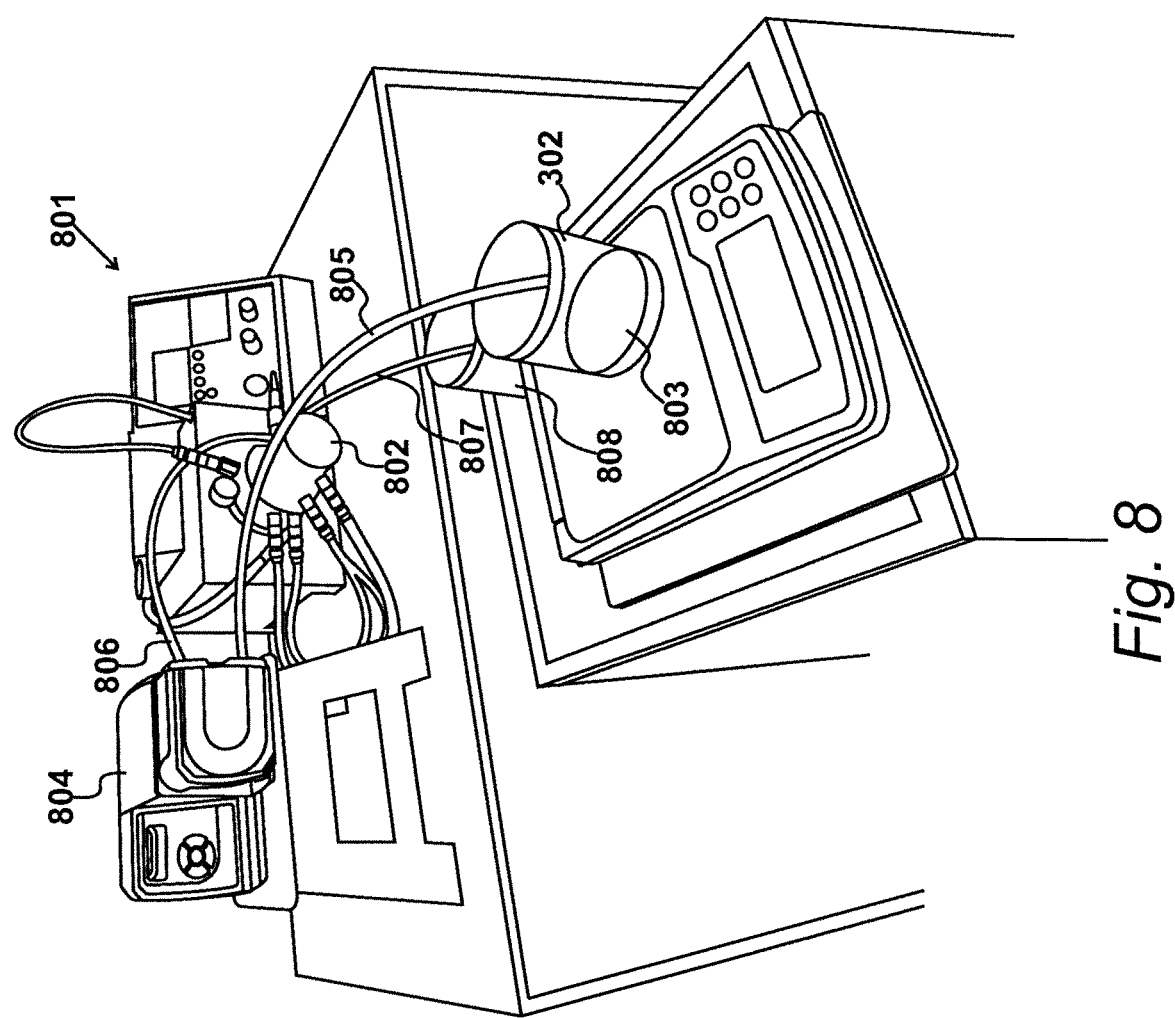
FIG. 8 shows bead milling equipment.
Figure 9:
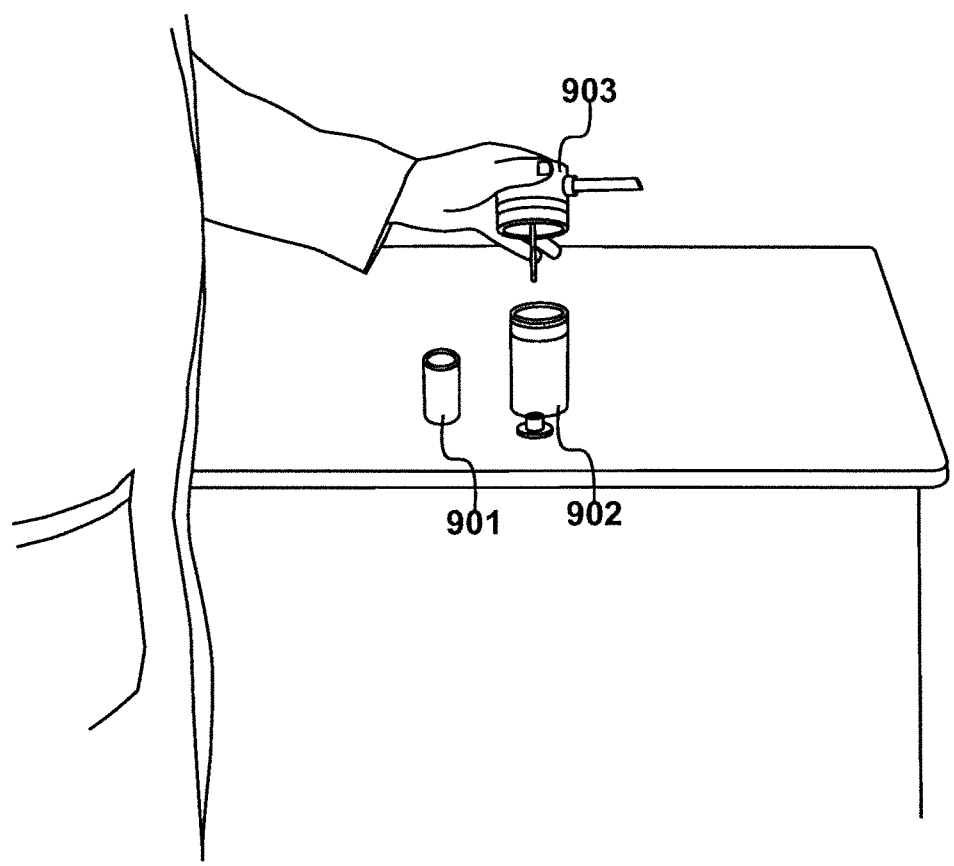
FIG. 9 illustrates the assembly of a filtering device.

A bead milling machine 801 is shown in FIG. 8. This includes a cylindrical chamber 802 where the milling operation is performed. A first mixture 803 is removed from the first container 302 by means of a peristaltic pump 804 via a feed pipe 805 between the first container 302 and the peristaltic pump 804. The peristaltic pump 804 supplies the first mixture 803 under pressure to the cylindrical chamber 802 via an inlet pipe 806 and an outlet pipe 807 supplies the second mixture (following the bead milling operation) to a second container 808.

FIG. 9

After bead milling the first mixture to produce the second mixture with a reduced number of agglomerates considered to be too large, a filtering operation is performed to produce a third mixture of agglomerates suspended in the resin, with substantially none of the agglomerates having a size considered to be too large.

A filtering device, the operation of which will be described with reference to FIG. 10, includes a cylindrical filter mesh 901 that is restrained within a filter cylinder 902. The cylindrical filter mesh 901 is then held in place within the filter cylinder 902 by means of a filter cap 903.

FIG. 10

Figure 10:
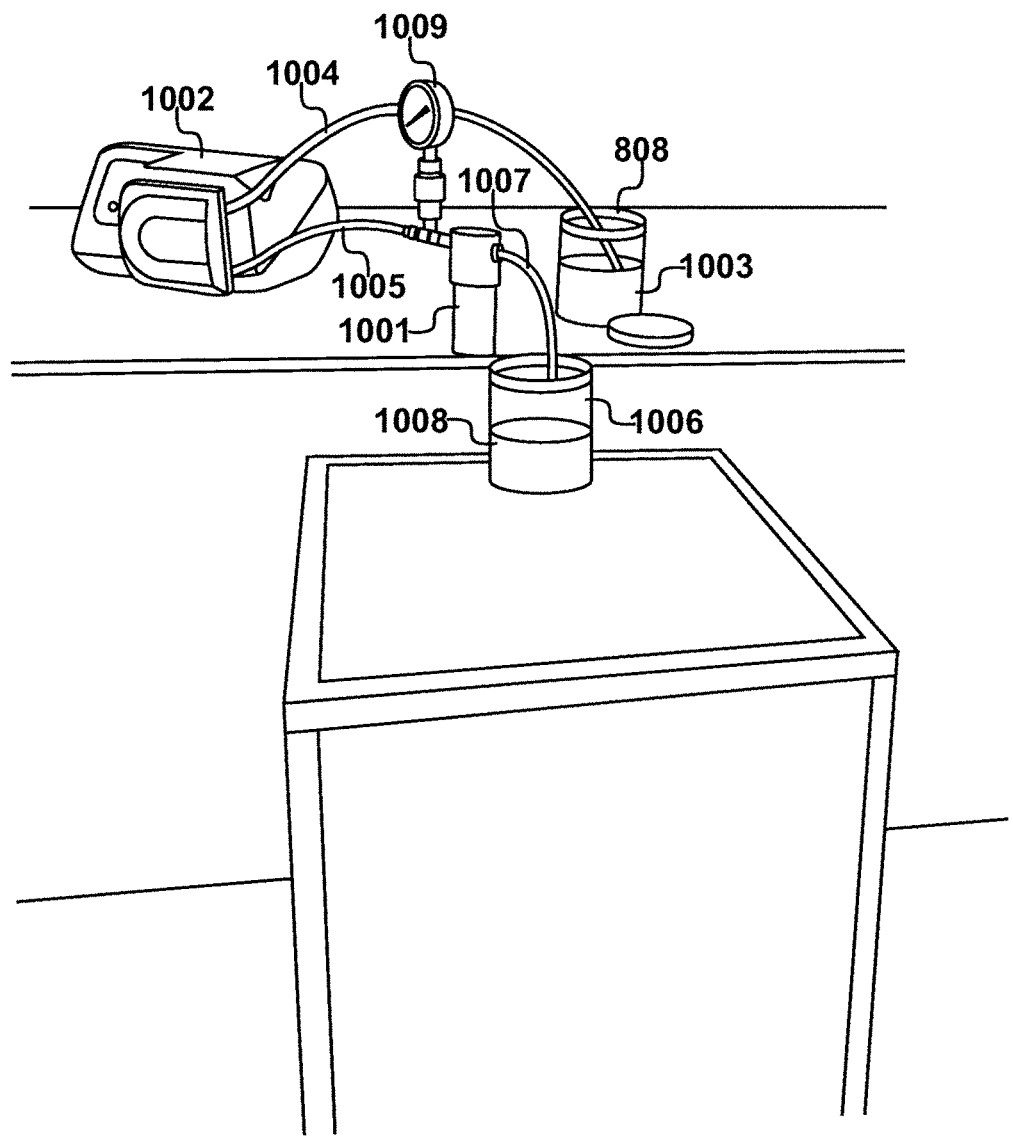
FIG. 10 shows the operation of the filtering device identified in FIG. 9.

An assembled filtering device 1001 is shown in FIG. 10. A second peristaltic pump 1002 receives the second mixture 1003 from the second container 808 via a second feed pipe 1004. The peristaltic pump 1002 supplies the second mixture to the filter device 1001 via a second inlet pipe 1005. The filtering device 1001 supplies the third filtered mixture to a third container 1006 via a second outlet pipe 1007. Thus, the third container 1006 now contains the mill base 1008 which may be transported and stored as previously identified at step 202.

The filtering device 1001 also includes a pressure gauge 1009, so that the pressure of material in the second inlet pipe 1005 may be monitored to ensure that the operation does not become dangerous and that replenishment of the cylindrical filter mesh 901 can occur when required.

FIG. 11

Figure 11:
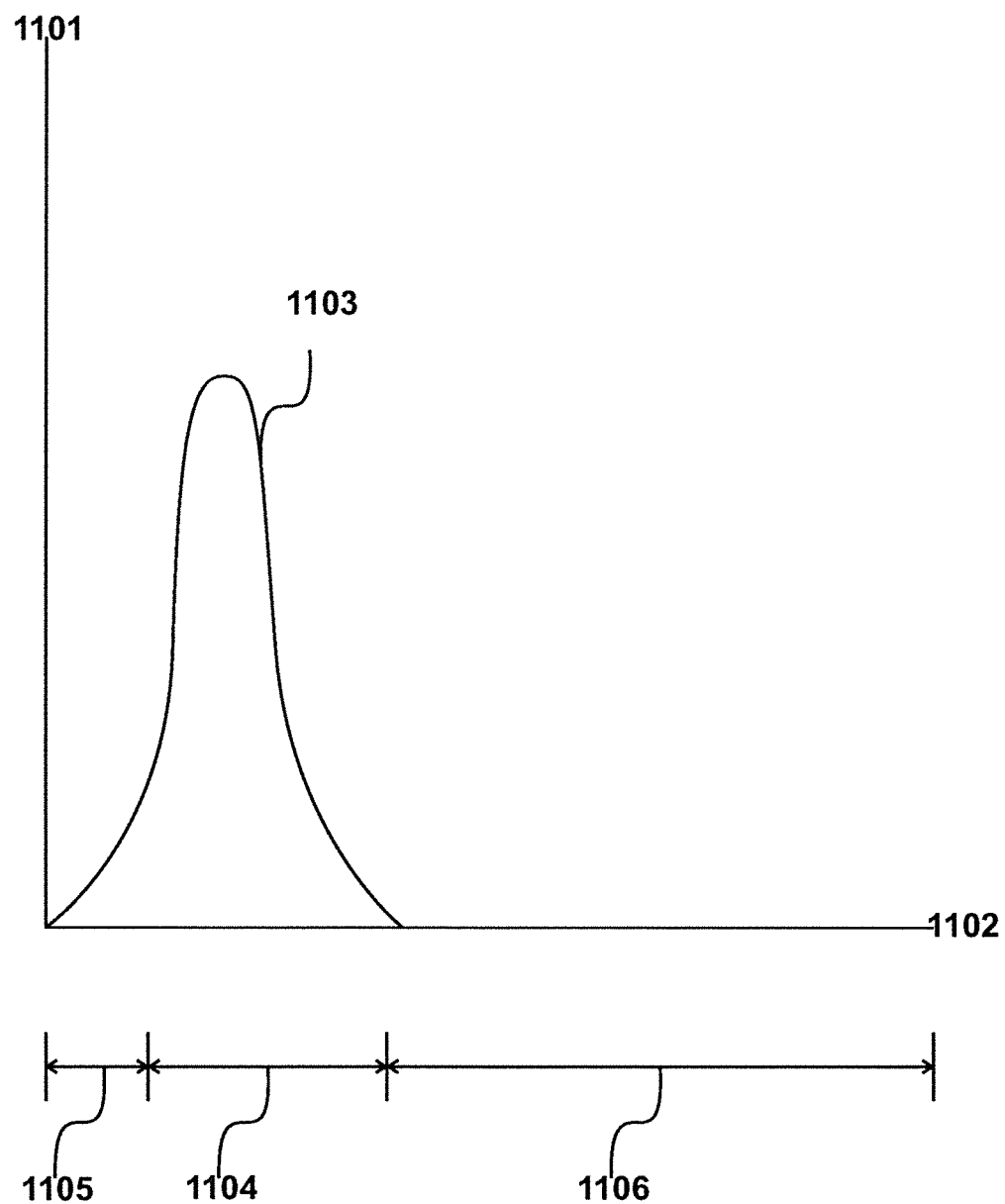
FIG. 11 illustrates the distribution of particle size.

An analysis of particle size present in examples of the third mixture shows that they have a distribution of the type illustrated in FIG. 11. In FIG. 11, frequency 1101 has been plotted against particle size 1102. As illustrated by curve 1103, the distribution is substantially normal (Gaussian) over a particle size of interest. It is appreciated that particle size refers to the largest dimension of the particle in question, such that, for a spherical particle, the 'size' refers to the largest diameter of such a particle, and, for an acicular particle, the 'size' refers to the longest dimension, typically the length.

Particles having the required size are present within a target range 1104. The smaller particles occupy a tolerated range 1105, in which the particles do not contribute to the resistive effects required but at the same time do not undermine these effects and are tolerated; provided that their concentration is not too large compared to the concentration of particles falling within the target range 1104.

The previously described processes remove particles that fall within an excluded range 1106. These particles are considered to be too large and will create detrimental effects if deployed. Consequently, the processes aim to remove all particles falling within the excluded range 1106 while minimising the number of particles that fall within the tolerated range 1105.

In an embodiment, agglomerates having a size greater than ten micrometres (10 μm) are considered to be too large and therefore fall within the excluded range 1106. During the bead milling process, operating power is controlled to minimise the production of agglomerates that fall within the tolerated range 1105. Preferably, agglomerate size is not reduced below five micrometres (5 μm).

In an embodiment, the cylindrical filter mesh 901 presents ten micrometre (10 μm) openings. Thus, the cylindrical filter mesh 901 should not allow any particles to pass that are larger than ten micrometres (10 μm). However, the proportion of particles present within the second mixture that are larger than ten micrometres (10 μm) has been substantially reduced by the bead milling operation. The bead milling operation alone fails. The filtering system alone fails. The results illustrated in FIG. 11 are achieved by firstly performing a reduced power bead milling operation followed by a filtering operation.

EXAMPLE 1

A mill base was prepared with a formulation of nine hundred grams (900 g) of VA401 resin with twenty-eight grams (28 g) of FS10P particles.

The formulation was speed mixed in a large speed mixer operating at one thousand six hundred revolutions per minute (1600 rpm) to produce a first mixture.

Bead milling was performed at a power of seven hundred and fifty watts (750 W) to produce a second mixture.

Speed mixing was repeated at a speed of one thousand six hundred revolutions per minute (1600 rpm).

The second mixture was filtered through a ten micrometre (10 μm) stainless steel filter to produce a mill base.

Thus, in the embodiment, the prepared mill base comprises a percentage by weight of nanoparticles to resin of three percent (3 wt %). In this way, the prepared mill base presents a much higher loading of resin compared to conventional methods.

FIG. 12

Figure 12:
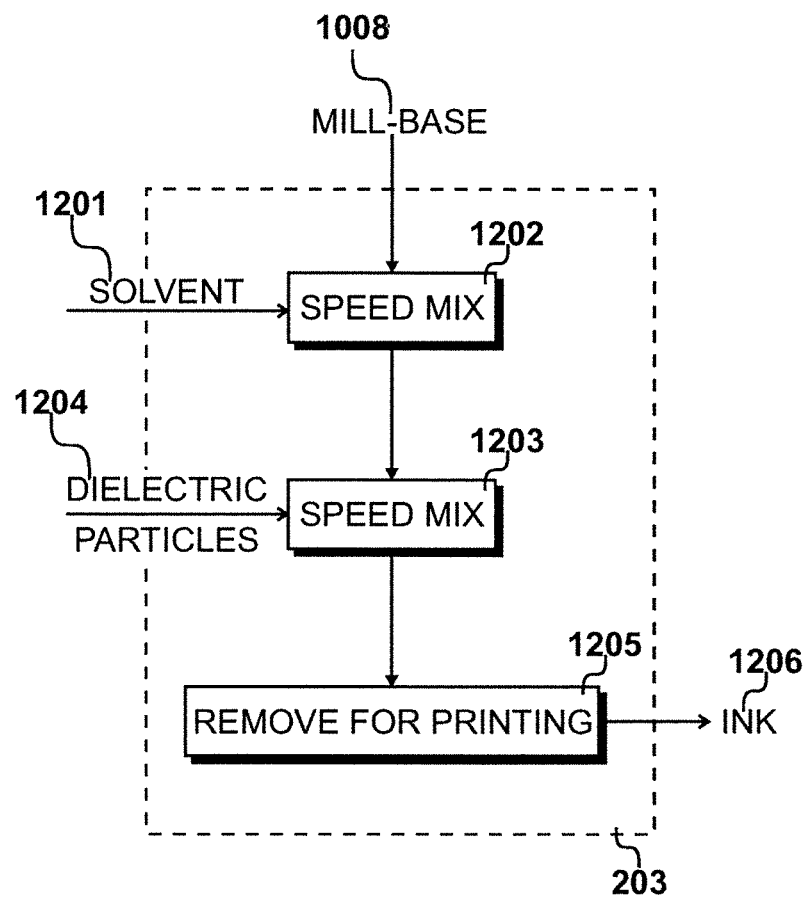
FIG. 12 details procedures identified in FIG. 2 for cutting a mill base for deployment.

Step 203 for cutting the mill 1008 to produce a deployment mixture ready for printing is detailed in FIG. 12. The mill base 1008 has been stored and is now cut with a solvent 1201 to produce a deployment mixture. The cutting process involves mixing the mill base with the solvent which results in a suitable deployment mixture. To obtain a preferred consistency, further undiluted VA401 lacquer may also be added at this stage. A speed mixing operation 1202 is performed upon the mill base 1008 in combination with the solvent 1201. Having used a resin identified by the commercial designation VA401, a suitable solvent would be that identified by the commercial designation ZV558.

In an embodiment, a further speed mixing operation 1203 is performed, possibly after dielectric particles 1204 have been introduced, in order to modify the response of the resulting ink. Thereafter, at step 1205 the resulting ink 1206 is removed for printing.

Example 2

To produce the deployment mixture, the filtered mill base was speed mixed at one thousand six hundred revolutions per minute (1600 rpm) for one minute.

Twenty-five grams (25 g) of the mill base was decanted into a vessel.

Fifteen grams (15 g) of solvent ZV558 was added, along with a further eleven point seven grams (11.7 g) of lacquer VA401.

Speed mixing at three thousand five hundred revolutions per minute (3500 rpm) was performed for one minute (1 min).

Nineteen milligrams (19 mg) of dielectric particles identified by commercial designation Aston Chemicals MST-547 were added.

Further speed mixing at three thousand five hundred revolutions per minute (3500 rpm) was conducted for one minute (1 min).

Following a deployment exercise, it was found that printed sensors no longer experienced any electrical shorting failures. Consequently, a more consistent electrical response was achieved. Furthermore, the material exhibited higher transparency and presented a lower haze.

FIG. 13

Step 204 for the formation of a subassembly will be described with reference to FIGS. 13 to 15. For deployment, in an embodiment, the deployment mixture is applied onto a base sheet. Solvent from the deployment mixture is evaporated, such that at least a proportion of agglomerates extend above a layer of dry resin. Thereafter, a cover sheet is arranged over this layer of dry resin to fabricate the subassembly.

Printing of the deployment mixture in liquid form is performed upon a base sheet 1301. Solvent from the deployment mixture is then evaporated, thereby leaving a layer of dry resin 1302. For the purposes of illustration, a first agglomerate 1303, a second agglomerate 1304, a third agglomerate 1305, a fourth agglomerate 1306 and a fifth agglomerate 1307 are shown restrained within the dry resin 1302. This arrangement is shown for illustrative purposes only and it should be appreciated that in most deployments, the agglomerates are substantially more dispersed in order to retain the transparent nature of the subassembly.

A cover sheet 1308 has been arranged over the layer of dry resin 1302. In this example, the cover sheet 1308 is in contact with the first agglomerate 1303 and is also in contact with the fifth agglomerate 1307. The second agglomerate 1304 and the third agglomerate 1305 extend above the dry resin 1302 but to a degree that is not sufficient to make contact with the cover sheet 1308. The fourth agglomerate 1306 is so small that it is totally embedded within the dry resin 1302. However, provided that a sufficient number of agglomerates are included that have an appropriate size, preferably that of a first agglomerate 1303 and the fifth agglomerate 1307, an appropriate resistive response can be achieved.

FIG. 14

Figure 14:
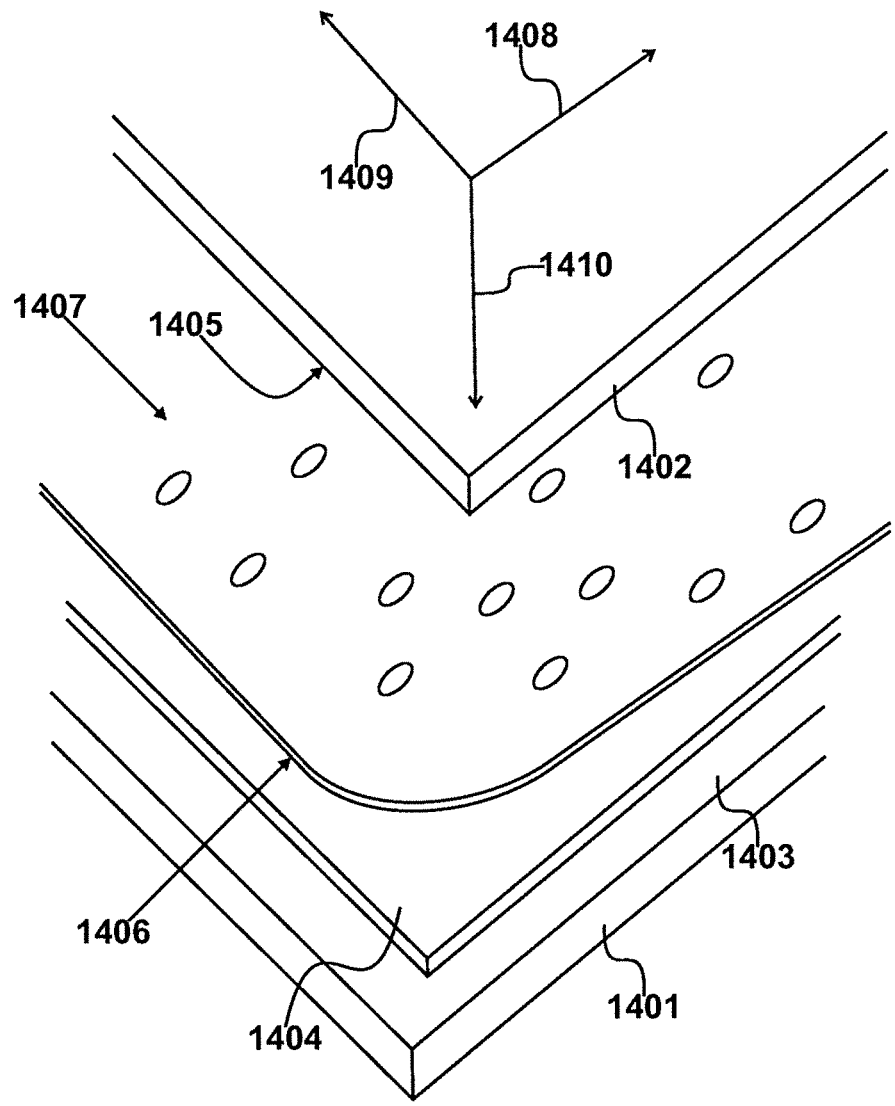
FIG. 14 illustrates a deployment of a touchscreen.

A touch screen fabrication is illustrated in FIG. 14. A first transparent substrate 1401 is provided along with a second substantially transparent substrate 1402. The first substrate 1401 has an upper surface 1403 and a conductive layer 1404 is applied to the upper surface 1403. In an embodiment, the conductive layer 1404 may be constructed from indium tin oxide. A similar conductive layer is applied to an underside 1405 of the second substrate 1402.

Between these two conductive layers, deployed material presents a planar layer having a first planar surface 1406 and a second planar surface 1407. Liquid deployment material may be deposited onto conductive layer 1404 by a screen-printing process. It is also possible to remove solvent by a process of ultraviolet light treatment.

When sandwiched together in the configuration illustrated in FIG. 14, the conductive layers attached to the upper surface 1403 and underside 1405, on respective substrates 1401 and 1402, allow position detection to be made in the X-dimension 1408 and in the Y-dimension 1409. Furthermore, the ink facilitates pressure detection in the Z-dimension 1410.

FIG. 15

Figure 15:
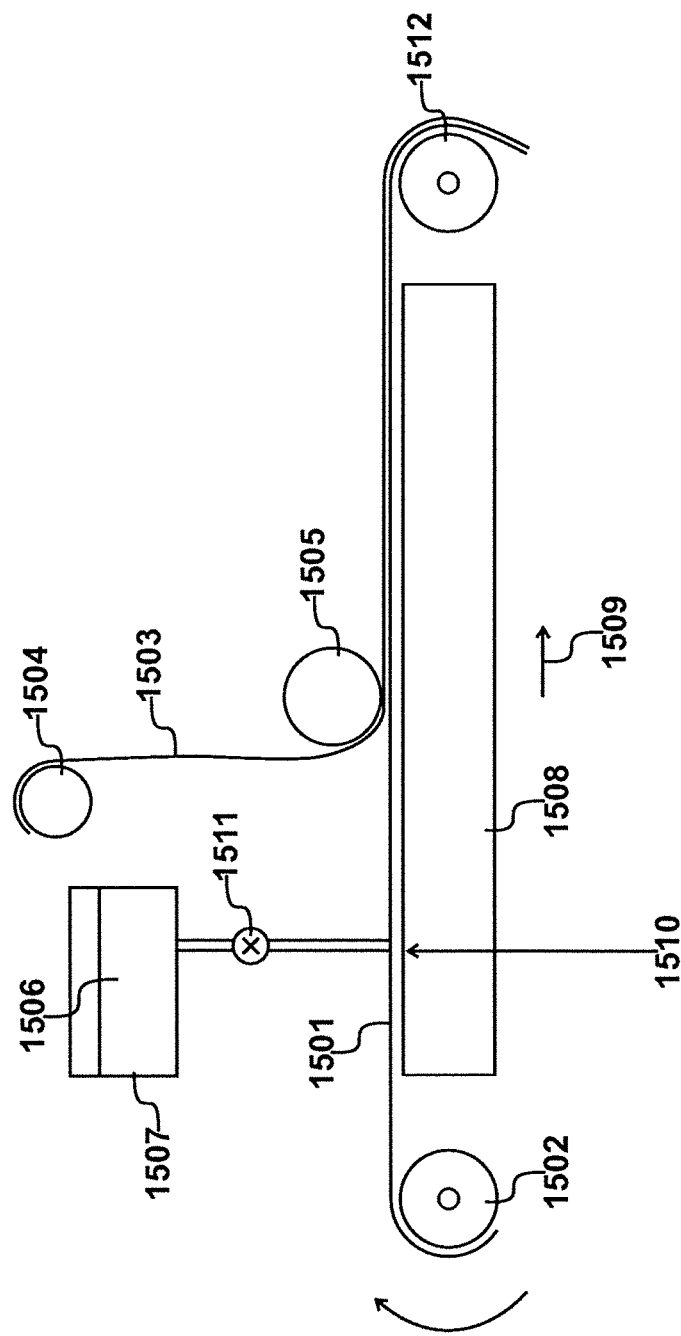
FIG. 15 shows a process for manufacturing a touchscreen.

A roll-to-roll process is illustrated in FIG. 15. A first conductive layer 1501 is received from a first supply reel 1502. A second conductive layer 1503 is received from a second supply reel 1504 and is supported by a roller 1505. Deployment material 1506 is retained in liquid form within a supply hopper 1507.

A first conductive material is pulled from its supply reel 1502 and is supported by a base unit 1508. As the material moves along the base unit 1508 in a direction indicated by arrow 1509, deployment material in liquid form is received at a reception position 1510, under the control of a motorised valve 1511. Roller 1505 applies the second conductive material above the deployment material which, in an embodiment, will have been heated or treated to effect evaporation of the solvent before the composition is encapsulated by the second conductive layer 1503. The resulting three-layer laminate is then received by a reception reel 1512.

FIG. 16

Figure 16:
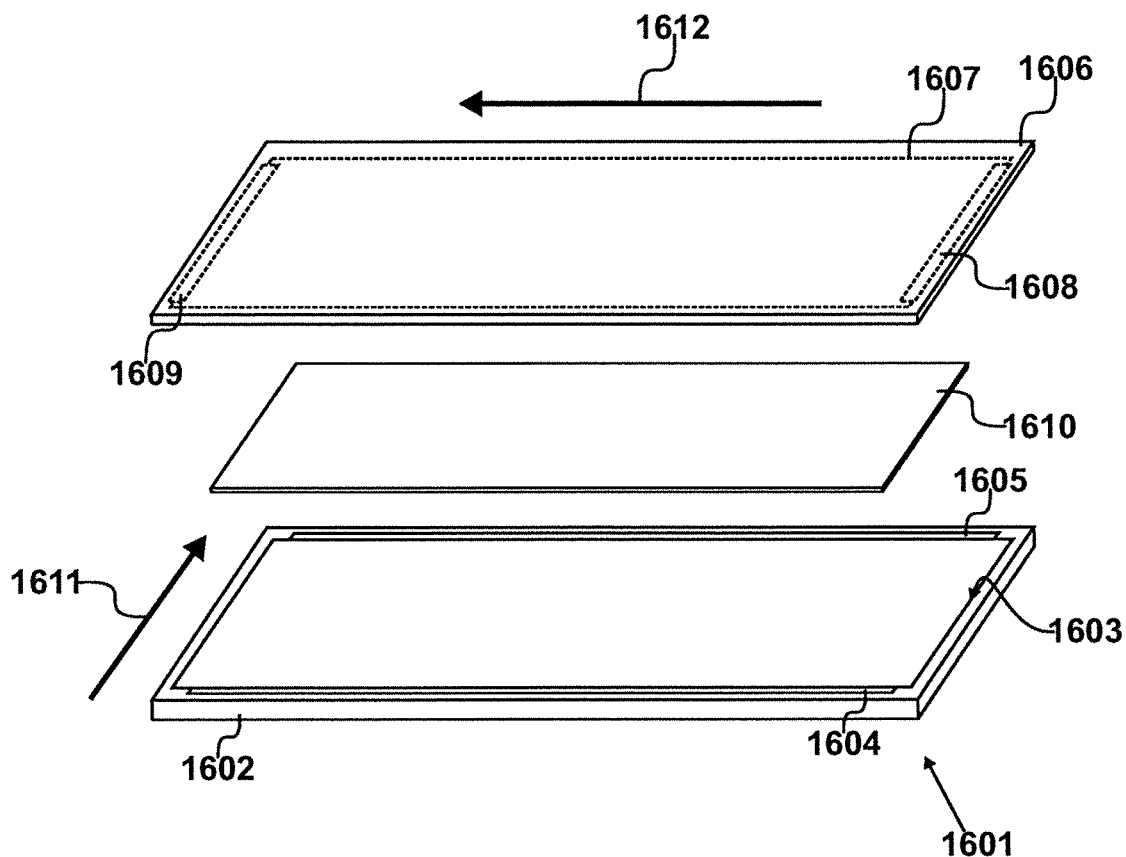
FIG. 16 illustrates a position sensing device.

A position sensing device 1601 is illustrated in FIG. 16. The position sensing device 1601 has a lower electrically insulating sheet 1602 formed of poly-ethaline-terephthalate (PET) onto which an indium tin oxide (ITO) conductive layer 1603 has been applied. The first conductive layer 1603 is substantially rectangular in shape and has highly conductive strips of material 1604, 1605 arranged along each one of two opposing sides.

The position sensing device 1601 also comprises a second sheet of electrically insulating material 1606 (also formed from PET) that has been similarly coated with ITO to form a second electrically conductive layer 1607 and a pair of highly conductive strips 1608 and 1609 arranged along opposite edges of the second conductive layer 1607. The second pair of conductive strips 1608/1609 are arranged to extend substantially perpendicular to the first set of conductive strips 1604/1605. A layer of deployment material 1610 is arranged between the two electrically conductive layers 1603 and 1607.

During operation, an electrical potential is applied across the first conductive strips 1604/1605 to produce a potential gradient in a first X-direction, indicated by arrow 1611, while voltage measurements are made of the electrical potential appearing at one or both of the second pair of conductive strips 1608/1609. Thus, if a force is applied to the upper surface of the upper sheet 1606, an X-coordinate of the position of the applied force may be determined. Similarly, an electrical potential is then applied across the second conductive strips 1608/1609 to produce an electrical potential gradient along the second electrically conducting layer 1607 in a second Y-direction, illustrated by arrow 1612. The electrical potential appearing at one or both of a first pair of conductive strips 1604/1605 is then measured to determine the Y-coordinate of any force that is applied to the upper sheet 1607.

Figure 13:
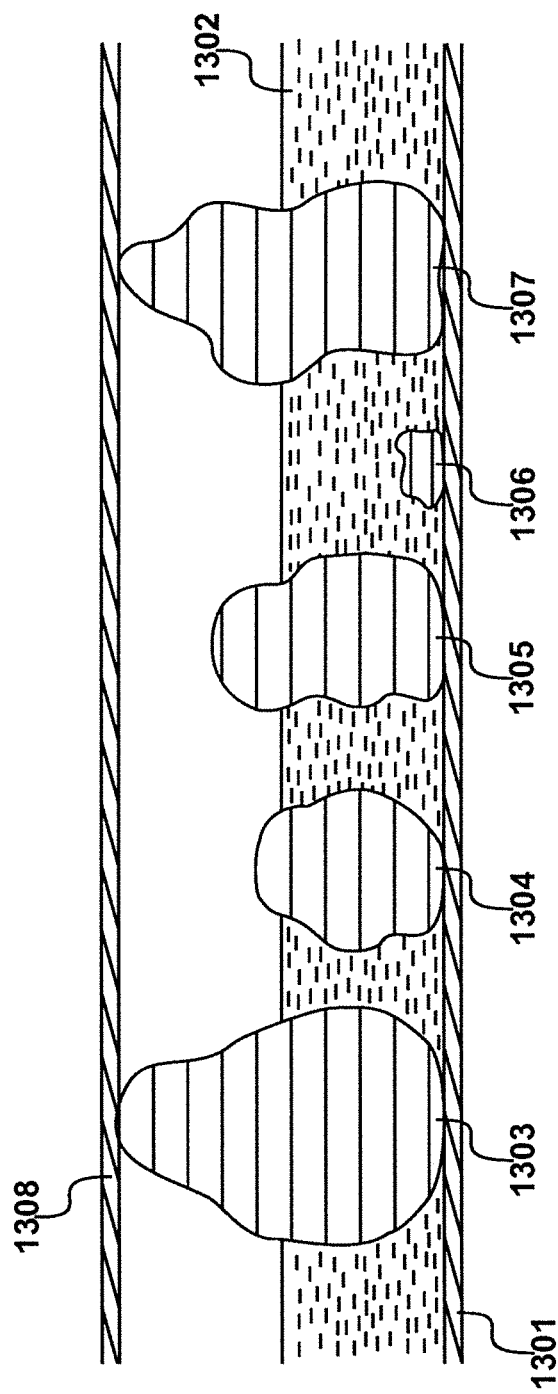
FIG. 13 shows an example of agglomerates supported in a resin.

The arrangement of FIG. 16 results in a configuration substantially similar to that illustrated in FIG. 13. Electrical conduction is provided between the first and second conductive layers at locations where pressure is applied. Furthermore, the resistance of the material reduces in response to applied pressure. Thus, by taking measurements of current flow through layer 1610, an indication of an extent of applied pressure can be determined.

Thus, the subassembly illustrated in FIG. 16 using the deployment material in a configuration described with reference to FIG. 13, allows for the construction of a mobile device, such as mobile device 101, as described with reference to FIG. 1.

The invention claimed is:

1. A method of agglomerating nanoparticles to form larger agglomerates, comprising the steps of:
    mixing said nanoparticles with a resin to form a first mixture of agglomerates suspended in said resin, said first mixture comprising agglomerates having a largest dimension which is greater than a predetermined specified dimension;
    bead milling said first mixture to produce a second mixture with a reduced number of agglomerates having said largest dimension greater than said predetermined specified dimension; and
    filtering said second mixture to produce a third mixture of agglomerates suspended in said resin, wherein substantially none of said agglomerates have a largest dimension greater than said predetermined specified dimension; wherein said first mixture comprises a percentage by weight of nanoparticles to resin of substantially three percent.

2. The method of claim 1, wherein said nanoparticles have said largest dimension of less than one hundred nanometers.

3. The method of claim 1, wherein said nanoparticles are substantially spherical.

4. The method of claim 1, wherein said nanoparticles are acicular.

5. The method of claim 1, wherein said particles are particles of antimony doped tin oxide.

6. The method of claim 1, wherein said resin is an undiluted lacquer.

7. The method of claim 6, wherein said lacquer is solvent-based.

8. The method of claim 1, wherein said predetermined specified dimension is ten micrometers.

9. The method of claim 1, wherein said mixing step is performed by a speed mixer operating at a rotational speed of up to one thousand six hundred revolutions per minute.

10. The method of claim 1, wherein said bead milling step provides a mixing power that is controlled to minimize reducing the largest dimension of agglomerates to a largest dimension of below five micrometers.

11. The method of claim 1, wherein said filtering step utilizes a filter with openings having a largest dimension of ten micrometers.

* * * * *